United States Patent
Englmeier

(10) Patent No.: US 7,119,834 B2
(45) Date of Patent: Oct. 10, 2006

(54) RECEIVER AND SYSTEM CALIBRATION SYSTEM AND METHOD

(75) Inventor: Martin H. Englmeier, Lenting (DE)

(73) Assignee: Microtune (Texas) L.P., Plano, TX (US)

(*) Notice: Subject to any disclaimer, the term of this patent is extended or adjusted under 35 U.S.C. 154(b) by 538 days.

(21) Appl. No.: 10/164,934

(22) Filed: Jun. 6, 2002

(65) Prior Publication Data

US 2004/0252196 A1   Dec. 16, 2004

(51) Int. Cl.
*H04N 5/44*   (2006.01)

(52) U.S. Cl. ..................................... 348/192

(58) Field of Classification Search ............... 348/181, 348/189, 192–194, 728, 638; 329/319, 321
See application file for complete search history.

(56) References Cited

U.S. PATENT DOCUMENTS

| | | | | |
|---|---|---|---|---|
| 4,580,107 | A | * | 4/1986 | Caldwell et al. ............... 331/10 |
| 4,706,263 | A | * | 11/1987 | von der Embse ........... 375/343 |
| 4,739,407 | A | * | 4/1988 | Mack et al. ................. 348/728 |
| 5,051,703 | A | * | 9/1991 | Idogawa et al. ............. 329/319 |
| 5,552,748 | A | * | 9/1996 | O'Shaughnessy ........... 331/1 A |
| 5,585,765 | A | * | 12/1996 | O'Shaughnessy ........... 331/111 |
| 5,589,802 | A | * | 12/1996 | O'Shaughnessy et al. .... 331/44 |
| 5,594,388 | A | * | 1/1997 | O'Shaughnessy et al. .. 331/1 R |
| 5,617,062 | A | * | 4/1997 | O'Shaughnessy ........... 331/111 |
| 5,638,029 | A | * | 6/1997 | O'Shaughnessy ............ 331/44 |
| 5,663,675 | A | * | 9/1997 | O'Shaughnessy ........... 327/553 |
| 5,699,385 | A | * | 12/1997 | D'Sylva et al. ............. 375/344 |
| 5,757,854 | A | * | 5/1998 | Hunsinger et al. .......... 375/260 |
| 6,177,964 | B1 | | 1/2001 | Birleson et al. |
| 6,559,799 | B1 | * | 5/2003 | Aoyama et al. ............. 342/377 |
| 2002/0076084 | A1 | * | 6/2002 | Tian et al. ................... 382/100 |

FOREIGN PATENT DOCUMENTS

| | | | |
|---|---|---|---|
| JP | 11032264 A | * | 2/1999 |
| WO | WO 01 58018 | | 8/2001 |
| WO | WO 02 23713 | | 3/2002 |

OTHER PUBLICATIONS

Annex to Form PCT/ISA/206 Communication Relating to the Results of the Partial International Search, PCT/US03/17580 mailed with the Invitation to Pay Additional Fees dated Sep. 24, 2003.
U.S. Appl. No. 09/407,734, Birleson.
U.S. Appl. No. 09/572,393, Birleson et al.

* cited by examiner

*Primary Examiner*—Paulos M. Natnael
(74) *Attorney, Agent, or Firm*—Fulbright & Jaworski LLP

(57) ABSTRACT

Systems and methods which implement calibration for signal errors in a communication network, such as non-uniform frequency response, are disclosed. According to a preferred embodiment of the invention, a calibration signal is communicated through the network and a receiver at a subscriber premises operates to calibrate the received signal for any tilt introduced in the signal path between the source of the signal and the subscriber premises. Preferred embodiments of the present invention provide for monitoring of the performance of signal correction components, such as by providing a feedback path from the receiver. Monitoring of calibration performance may be utilized according to preferred embodiments for developing a more full understanding of the operation of the network, identify sources of network problems, and even predict system degradation and take appropriate action before service interruption results.

59 Claims, 2 Drawing Sheets

RECEIVER AND SYSTEM CALIBRATION SYSTEM AND METHOD

CROSS-REFERENCE TO RELATED APPLICATIONS

The present application is related to co-pending and commonly assigned U.S. patent application Ser. No. 09/407,734 entitled "System and Method for a Single Conversion Tuner," filed Sep. 28, 1999, and U.S. patent application Ser. No. 09/572,393 entitled "Broadband Integrated Tuner," filed May 15, 2000, which is a continuation of U.S. patent application Ser. No. 08/904,908, now U.S. Pat. No. 6,177,964, entitled "Broadband Integrated Television Tuner," filed Aug. 1, 1997, the disclosures of which are hereby incorporated herein by reference.

TECHNICAL FIELD OF THE INVENTION

The invention relates generally to communication systems and, more specifically, to providing calibration of receivers and the communication system to which they are coupled.

BACKGROUND OF THE INVENTION

In communication systems, such as cable systems which distribute television and other signals over a large area, there are typically many components utilized in providing communication of signals between a source, such as at a cable plant, and receivers, such as at individual subscriber premises. However, such communication systems and their attendant components often introduce errors into the transmitted signals, such as signal distortion. For example, cable television signals are broadband (e.g., 50 MHz to 1 GHz), typically including as many as 100 frequency division television channels, and are often subject to network introduced tilt (non-uniform frequency response) over the frequencies of the communicated band.

Accordingly, cable distribution systems today implement devices, such as amplifiers and equalizers, to provide correction of tilt within the network band. For example, to provide tilt correction, a cable distribution system may employ amplifiers and equalizers distributed throughout the network. However, such tilt correction is generally provided for tilt correction at the point in the network the particular tilt correction device is deployed. Accordingly, even with a perfectly calibrated system, an amount of tilt is present in the signals as received by individual subscribers. For example, subscribers typically experience tilt associated with the network components deployed in the signal path disposed between each particular subscriber and a last tilt correction device in the network. Because each subscriber experiences an appreciably different signal path in this "last mile," it is typically not possible to compensate for the tilt assosicated with the last mile using typical deployment of correction devices.

Moreover, the amount of tilt correction provided by such devices must be calibrated to correspond to the amount of tilt experienced in the signal in the signal path leading to the tilt correction device. Introduction of additional components into this signal path, failure of particular components, and even time and temperature related operational changes may result in less than optimal tilt correction in the network. Recalibration of such devices typically requires dispatching of service personnel to the appropriate device locations.

There are presently no devices allowing the cable plant to verify maintenance or monitor the performance of the devices providing tilt correction in the system. Accordingly, if there is a problem in the cable network, the cable operator must typically rely upon the subscribers calling the cable plant with a trouble report. Only by these calls will the cable plant identify that there is a problem in the system and, often through correlating the location of the subscribers complaining and the types of complaints being registered, will the cable operator be able to isolate the source of the problem and, thus, dispatch service personnel to the appropriate location.

Accordingly, a need in the art exists for systems and methods which provide for signal calibration, such as signal tilt correction/calibration, for individual subscriber premises. A further need exists in the art for such systems and methods to provide feedback to a centralized operations center, such as a cable plant, with respect to calibration.

BRIEF SUMMARY OF THE INVENTION

These and other objects, features and technical advantages are achieved by systems and methods which implement calibration for signal errors in a network system, such as in terms of frequency response, into receiver equipment deployed at subscriber premises. According to a preferred embodiment of the invention, a calibration signal is communicated through the network, such as from a cable plant or other point in the network, and receivers at subscriber premises operate to calibrate the received signal for any tilt introduced in the signal path between the source of the signal and the subscriber premises.

Receivers of the present invention preferably include a tracking filter operated to provide calibration according to the present invention. For example, a control circuit is preferably utilized in operating a receiver tracking filter to provide a desired frequency response. Preferably, a look up table associated with the tracking filter provides frequency response correction to the tracking filter in association with a tracking filter control signal, such as a signal controlling the tracking of the passband. According to a preferred embodiment, system calibration information, such as derived from use of the aforementioned calibration signal, is used to update such look up table information. Accordingly, in addition to providing frequency response corrective information for operation of the tracking filter, a preferred embodiment tracking filter control circuit further operates to provide correction of signal errors introduced by other components in the signal path leading to the receiver.

Preferred embodiments of the present invention provide for monitoring of the performance of signal correction components at a central location, such as by providing a feedback path from the receiver. For example, a preferred embodiment tracking filter control circuit may operate to monitor a calibration signal, update an associated look up table, and provide confirmation of successful completion of the calibration to the cable plant. According to preferred embodiment, such calibration system monitoring is provided through an already established return path, such as that which has been deployed for billing (e.g., pay per view) or other uses.

Monitoring of calibration performance may be utilized according to preferred embodiments for more robust system monitoring and diagnoses than the confirmation of successful calibration of individual subscriber units mentioned above. For example, systems of the present invention may provide detailed information such as an amount of calibration required, particular frequencies at which calibration is required, a rate of change at which corrective information must be calibrated to maintain desired operation, and the like. Accordingly, a centralized system, such as a network operations center (NOC) or operations, administration, maintenance, and provisioning (OAM&P) system, may develop a more fill understanding of the operation of the network, identify sources of network problems, and even predict system degradation and take appropriate action before service interruption results.

A technical advantage of the present invention is that system calibration is provided for the signal path up to a subscriber's premises. A further technical advantage provided according to preferred embodiments of the present invention is that existing circuitry, such as receiver correction circuitry and/or feedback paths, may be utilized in providing system calibration according to the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

In providing reception of communication signals, such as television channel signals communicated through a cable television (CATV) system, prior art systems have sometimes implemented single conversion tuners, such as shown and described in the above referenced patent application entitled "System and Method for a Single Conversion Tuner." However, single conversion tuners are generally designed to process a narrow range of frequencies at any one time. Accordingly, the use of such tuners in a communication system utilizing broadband transmission is typically accomplished through the use of a tracking filter on the front end of the tuner.

Figure 1:
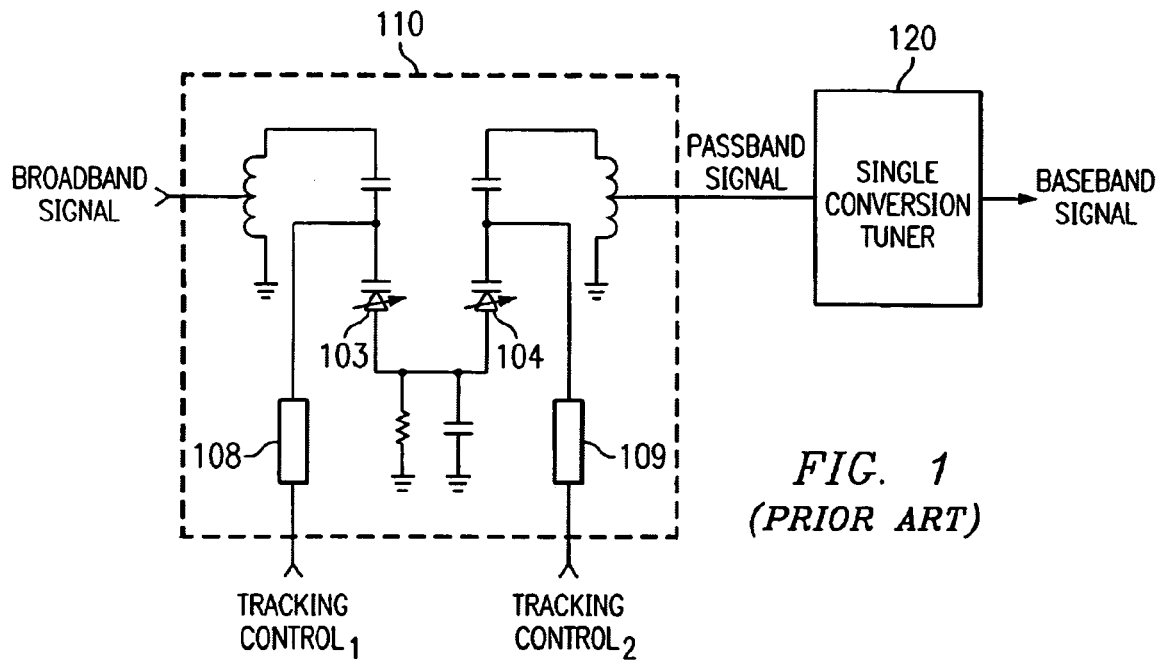
FIG. 1 shows a prior art single conversion tuner and tracking filter

A typical arrangement of a tracking filter providing a front end for a single conversion tuner, such as might be used in the aforementioned CATV system, is shown in FIG. 1. Specifically, tracking filter 110 is coupled to the input of single conversion tuner 120. It should be appreciated that additional circuitry, not shown in FIG. 1, may be coupled to the tracking filter and/or tuner of FIG. 1, such as a demodulator coupled to tuner 120.

In operation, as tuner 120 is tuned across the frequency band during a channel change, the tracking filter is tuned to allow only a few channels to pass into the tuner. For example, tracking voltages, such as on the order of from 0 to 36 Volts, may be applied to control interfaces "tracking control1" and "tracking control2" to tune variable capacitors 103 and 104 through resistors 108 and 109. As a result, tuner 120 has to provide good response characteristics for only a few channels at a time, instead of over substantially the entire bandwidth. For example, in a cable television system the tuner would allow only a few channels to enter the receiver front end, instead of the full 100 or more channels in the total cable set. Accordingly, the tracking filter beneficially reduces the dynamic range required in the front end of a conventional receiver.

Figure 2A:
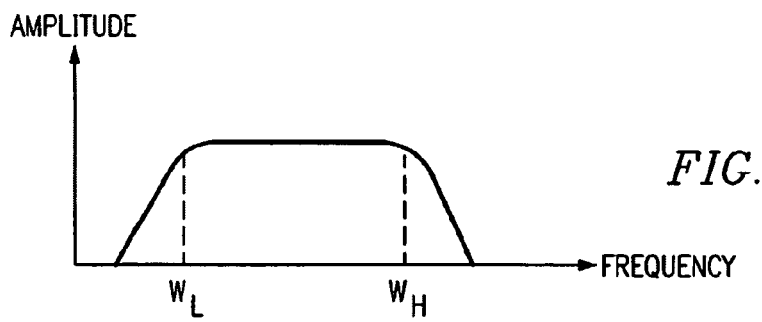
FIG. 2A shows an ideal tracking filter frequency response curve.

In order to provide desirable signal quality and consistent performance throughout the operational band, tracking filter 110 preferably has a relatively flat frequency response, such as the ideal frequency response illustrated in FIG. 2A, throughout its range of frequencies. Accordingly, tracking voltages applied to the tracking control1 and tracking control2 interfaces may be manipulated not only to provide tracking of a frequency band including a particular channel received by tuner 120 but also to provide a flat frequency response approaching that of FIG. 2A.

Figure 3:
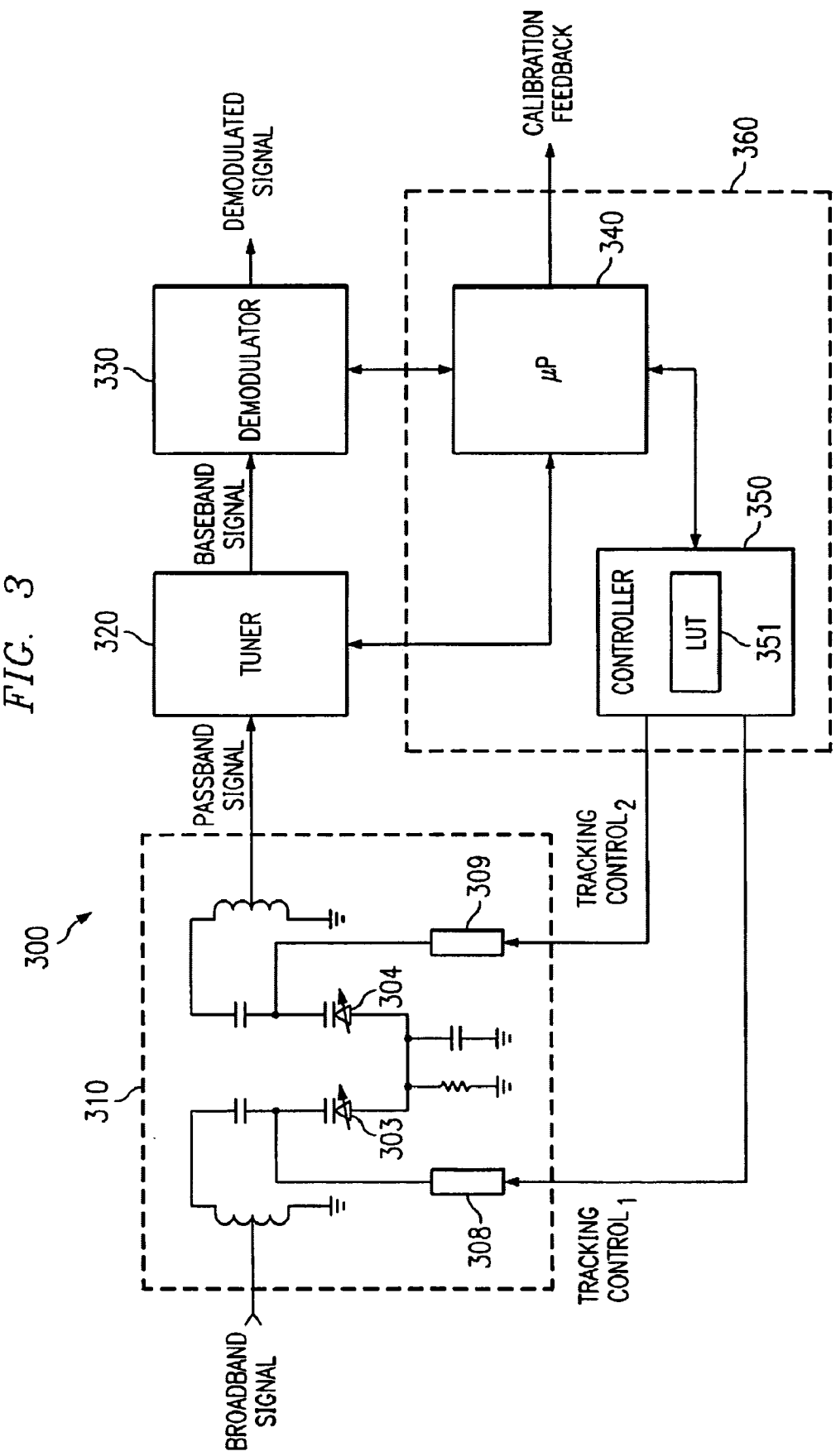
FIG. 3 shows a preferred embodiment system adapted to provide g to the present invention.

Directing attention to FIG. 3, a preferred embodiment of the present invention utilizing tracking filter 310 and tuner 320, similar to that described above with respect to FIG. 1, is shown as system 300. Also shown in system 300 of FIG. 3 is demodulator 330, such as may be an existing demodulation circuit coupled to tuner 320 to demodulate a subscriber signal from a selected channel of a broadband signal tuned to by tuner 320. For example, where system 300 is deployed as a CATV set top box, demodulator 330 may provide a selected television channel signal to a television device such as a video cassette recorder or a television set. Of course, system 300 may be adapted for uses outside of television signal communication, such as data communication as a cable modem system and the like.

It should be appreciated that tuner 320 utilized according to the present invention may be any of a number of tuner configurations. For example, tuner 320 may be embodied as a single conversion tuner as shown and described in the above referenced patent application entitled "System and Method for a Single Conversion Tuner" or a double conversion tuner as shown and described in the above referenced patent application entitled "Broadband Integrated Tuner."

Tracking filter 310 preferably may include 2 or more adjustable filter circuits to provide controllable selection of low pass cutoff frequencies ($\Omega L$) and high frequency cutoff frequencies ($\Omega H$). For example, a low pass tracking voltage may be applied to tracking filter 310 by controller 350 through the tracking control1 interface and resistor 308 to tune variable capacitor 303 of a first filter circuit. Similarly, a high pass tracking voltage may be applied to tracking filter 310 through the tracking control2 interface and resistor 309 to tune variable capacitor 304 of a second filter circuit.

Controller 350 (controller 350 and microprocessor 340 together preferably comprising control circuit 360) is preferably coupled to tracking filter 310 to control operation thereof. Preferably controller 350 includes look up table (LUT) 351 to provide information for control of tracking filter 310 with respect to various operating parameters. For example, where tuner 320 is a single conversion tuner, LUT 351 may provide information with respect to corrective voltages to be applied with respect to various low pass cutoff frequency ($\Omega_L$) and high pass cutoff frequency ($\Omega_H$) tracking voltages to provide a frequency response approaching that of the ideal flat frequency response of FIG. 2A.

According to a preferred embodiment of the invention, control circuitry, such as the aforementioned controller 350, is coupled to tracking filter 310 to provide calibrated operation with respect to the network signal path coupled thereto. For example, according to a preferred embodiment LUT 351, providing information with respect to correction voltages for desired frequency response operation of tracking filter 310, is modified such that the correction voltage information is calibrated with respect to network tilt experienced at the point at which system 300 is deployed. Accordingly, not only is a desired frequency response provided with respect to operation of the tracking filter itself, but a frequency response which corrects tilt introduced by components in the signal path coupled thereto is also provided. Ideally, tilt correction provided by the present invention corrects for non-uniform frequency response introduced by components at any and all points between a cable plant and a subscriber premise at which system 300 of FIG. 3 is deployed.

According to a preferred embodiment, LUT 351 may initially be configured with corrective information for providing operation of tracking filter 310 for ideal frequency response according to FIG. 2A. However, once deployed in a network, such as at a subscriber premises coupled to a CATV system, LUT 351 is preferably updated, such as periodically, occasionally, or on demand, to alter the information stored therein responsive to the frequency response of the network as viewed from the subscriber premises. For example, calibration cycle times may be established during periods in which there is little or no subscriber use of the network, such as very late at night or very early in the morning. Additionally or alternatively, calibration cycles may be implemented when it is detected that a particular subscriber system or systems are not in use, such as when a particular neighborhood of subscriber premises show little or no network activity. Furthermore, calibration cycles may be implemented upon demand, such as when a particular piece of equipment, whether a system employing the present invention or a component deployed in the signal path coupled thereto, is deployed in the network.

Calibration signals may be communicated through the network, from a centralized source such as a cable plant or some other point in the network from which frequency response calibration is desired, at predetermined increments throughout the network's operational band to thereby provide system 300 with a sampling of the frequency response of the network as viewed by the particular subscriber premises at which system 300 is deployed. Additionally or alternatively, embodiments of the present invention may utilize calibration signals which, although are between the upper and lower limits of a band communicated by the network, are out of band signals, such as being disposed within channel guard bands or other reserved spectrum.

A calibration cycle may be accomplished using an unlimited amount of calibration signals or tones, as the accuracy of the whole system requires. For example, a more robust sampling of the network might be provided by sending calibration signals from a cable plant, and correspondingly system 300 monitoring those signals, at each channel of a plurality of channels communicated through the network. However, such a sampling would typically require a substantial amount of time to accomplish, in addition to potentially disrupting communication on each channel of the network, and is unlikely to provide significantly more information than a properly chosen smaller calibration sample. Accordingly, in order to provide a calibration procedure which is accomplished in an acceptable amount of time employing an economical amount of resources, preferred embodiments of the present invention use approximately 4 to 5 different calibration signals which are preferably distributed equally from the lowest end of the network band to the upper end of the network band.

Preferred embodiments of the present invention operate to provide calibration signals selected to provide a relatively accurate picture with respect to network frequency response without providing a calibration signal at each channel of the network. For example, a preferred embodiment of the invention may provide a calibration signal at a high end, low end, and center of a plurality of channels communicated. Where the network provides very broadband communication, such as with the aforementioned CATV systems, this selection of calibration signals may be supplemented with one or more calibration signals spaced there between.

Preferably, to minimize service disruption and/or degradation of subscriber signal quality, embodiments of the present invention operate to perform calibration cycles, or portions thereof, intelligently with respect to subscriber utilization of the network. In a large network it is unlikely that all subscriber activity will completely cease at any particular time. However, it is likely that at particular times some portion of the network band will be unused or only minimally used. Similarly, it is likely that each subscriber device, such as a CATV set top box including system 300 of the preferred embodiment, will experience periods of non-use. For example, during broadcast of certain channels in a CATV system, particular set top boxes will be off (e.g., unused by subscribers in viewing CATV programming) and other set top boxes will be on (e.g., used by subscribers in view CATV programming), although not in use with respect to certain channels. Accordingly, preferred embodiments of the invention will work with the set top boxes employing a system such as system 300 which are off (otherwise unused), using a frequency segment of the network band which is unused, or substantially unused, by the set top boxes which are on (in use by subscribers).

Specifically, a preferred embodiment of the invention will transmit a calibration signal corresponding to one or more unused or substantially unused frequency segments from a cable plant for reception and use by the unused set top boxes in correcting system tilt as described above. Additional frequency segments and/or set top boxes are preferably utilized later, as they become unused, to fill in information with respect to a complete calibration cycle of the preferred embodiment. Additionally or alternatively, information with respect to frequency segments for which calibration signals are transmitted may be used in interpolating information with respect to frequency segments for which calibration signals are not transmitted. For example, if a particular frequency segment, e.g., CATV channel, remains in constant and heavy use, frequency segments on either side of this frequency segment may be used for communication of calibration signals for interpolation of the network frequency response with respect to the frequency segment unavailable for calibration.

It should be appreciated that both the above described scheduling calibration with respect to particular unused network band segments and interpolating calibration for portions of network band based upon calibration operation using other segments of network band may be utilized depending upon the calibration accuracy and calibration speed demands of the network operator. For example, a limiting factor in attaining increased accuracy with respect to calibration according to embodiments of the present invention is time and availability of certain frequency bands. However, according to alternative embodiments of the invention network operators might elect to provide calibration at low use times, such as during the night, to send out calibration bursts for fractions of seconds, minimizing subscriber impact both because subscriber use is low and because the calibration signals are very brief, in order to more readily cover the whole network band.

In operation according to a preferred embodiment, updating of LUT 351 for optimized frequency response with respect to the network is performed by system 300. For example, according to a preferred embodiment of the present invention, microprocessor 340 recognizes the existence of a calibration cycle, such as through reference to a predetermined schedule and/or by monitoring for the presence of a calibration tone, sequence, or communicated data (such as communicated through a forward data channel), and monitors attributes of a calibration signal as demodulated by demodulator 330. Microprocessor 340 may distinguish the different calibration signals or test tones through narrow band modulations, which system 300 is able to demodulate through demodulator 330, and monitor attributes thereof. For example, microprocessor 340 may compare the amplitude, signal quality, signal distortion, and/or like attributes of a calibration signal as demodulated by demodulator 330 for comparison to predetermined threshold or exemplary values, such as a known value at which the calibration signal was originated, and/or comparison to attributes of other calibration signals, such as a same calibration signal as measured in a previous calibration cycle or different calibration signals of the same calibration cycle. Microprocessor 340 preferably operates to control tuner 320, and correspondingly tracking filter 310, to operate with respect to calibration signals throughout the band of operation and, thus, monitor attributes of these calibration signals as demodulated by demodulator 330.

Figure 2B:
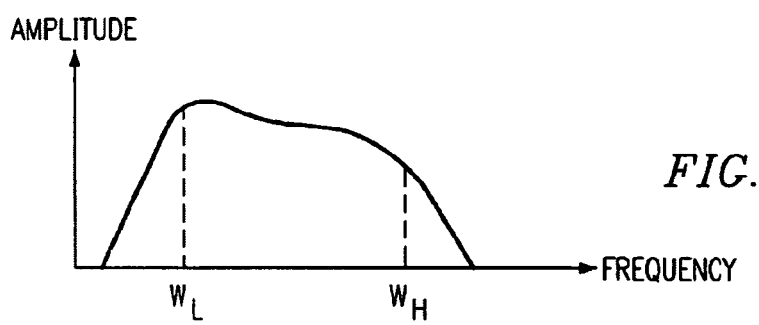
FIGS. 2B–2C show tracking filter frequency response curves adjusted sent invention to compensate for signal tilt introduced by the network.
Figure 2C:
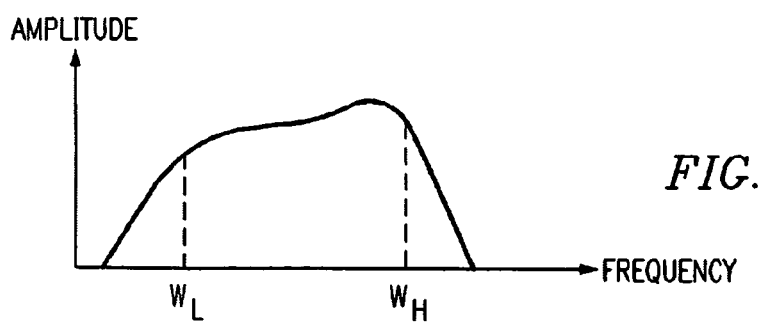

According to the preferred embodiment, if microprocessor 340 detects that calibration signals as demodulated by demodulator 330 do not provide an acceptable flat frequency response, such as shown in the ideal frequency response of FIG. 2A, controller 350, and correspondingly LUT 351, is preferably modified to compensate for the measured frequency response. For example, although system 300 may initially be deployed with LUT 351 configured to provide a desired frequency response with respect to tracking filter 310, tilt introduced into signals by components of the network coupled thereto may cause the calibration signals as monitored by microprocessor 340 to exhibit a non-uniform frequency response. Accordingly, microprocessor 340 may update LUT 351 to cause corrective operation in tracking filter 310. For example, where a negative tilt is measured by microprocessor 340, LUT 351 may be updated to cause a positive response with respect to tracking filter 310, as shown in FIG. 2B. Similarly, where a positive tilt is measured by microprocessor 340, LUT 351 may be updated to cause a negative response with respect to tracking filter 310, as shown in FIG. 2C. Accordingly, the preferred embodiment system 300 uses an internal control circuit in order to shape the response curve in the required channels so that overall, an ideal characteristic is generated using controller 310 to compensate for any deviations in the frequency response, not only in its own receiver, but from the network system including network cables, equalizers, amplifiers, and other distribution elements of the network.

It should be appreciated that the above described preferred embodiment of the present invention provides calibration with respect to network communication without requiring dispatching of service technicians. Moreover, the calibration of the present invention may be implemented frequently, such as nightly. Accordingly, the present invention provides a calibration technique which is uniquely adapted to compensate for addition of components into the network, failure of components within the network, and even time and temperature operational changes associated with network components.

Although a preferred embodiment has been described above with respect to utilizing a tracking filter, tuner, and demodulator provided for subscriber signal use, thereby optimizing the utilization of various system components, it should be appreciated that embodiments of the present invention may implement separate circuitry including one or more such components for use in calibration according to the present invention. For example, where calibration signals are provided in a portion of the network band not utilized by subscriber signals, it may be desirable to utilize circuitry substantially as shown in FIG. 3, all of which is dedicated for use according to the present invention, to thereby provide for calibration during use of the network by a subscriber.

It should be appreciated that systems of the present invention provide calibration with respect to signal attributes as present at the position in the network such systems are disposed, thereby providing calibration for optimized operation of individual subscriber devices employing the present invention. Of course, as the preferred embodiment devices are calibrated with respect to their particular location in the network, relocation of such devices within the network is preferably accompanied by recalibration. As it is envisioned that calibration of preferred embodiments of the present invention will be conducted frequently, such as every night, such recalibration will typically be accomplished without operator interaction relatively quickly after a device relocation. Of course, embodiments of the invention may provide for recalibration upon demand, such as upon a device being relocated or at the whim of an operator, if desired.

Although a preferred embodiment has been described with respect to a look up table providing information with respect to providing a desired frequency response for a tracking filter associated therewith, there is no limitation to the present invention including such information. For example, LUT 351 of an alternative embodiment may be provided with no corrective information until such time as a calibration cycle of the present invention generates corrective information with respect to the network.

In addition to providing corrective operation, such as described above, preferred embodiments of the present invention provide feedback with respect to calibration operations. According to preferred embodiment such feedback is provided through an already established return path, such as a return channel which has been deployed for billing (e.g., pay per view) or other uses. Such feedback may be utilized to confirm calibration operation, provide calibration data to a centralized database, for system diagnoses, or other purposes.

Systems of the present invention may provide calibration feedback including detailed information such as an amount of calibration required, particular frequencies at which calibration is required, a rate of change at which corrective information must be calibrated to maintain desired operation, and the like. Accordingly, a centralized system, such as a network operations center (NOC) or operations, administration, maintenance, and provisioning (OAM&P) system, may develop a more full understanding of the operation of the network, identify sources of network problems, and even predict system degradation and/or failure and take appropriate action before service interruption results. For example, system 300 may provide feedback to a NOC indicating it was not possible to accomplish calibration in certain channels, which information might provide the network operator the possibility to track down defects in the network to components levels, such as particular cables, equalizers, amplifiers or other network components. It should be appreciated that analysis of such feedback information with respect to a plurality of subscriber premises affecting calibration according to the present invention may further aid in diagnoses of the source or sources of the experienced conditions.

In addition to providing benefits of calibration with respect to individual subscriber premises and improved network reporting and diagnostics, it should be appreciated that the present invention allows for the network operator to reduce the number of corrective devices, such as amplifiers and equalizer circuits, deployed throughout the network. Specifically, as the subscriber equipment, or other equipment implementing the present invention, provides for compensation and calibration, it is expected that at least a portion of the corrective circuitry typically deployed in a network, such as a CATV network, today will no longer be required. This allows the network operator to reduce the amount of network components and reduce the cost for establishing the network.

Although the present invention and its advantages have been described in detail, it should be understood that various changes, substitutions and alterations can be made herein without departing from the spirit and scope of the invention as defined by the appended claims. For example, although the present invention has been described with respect to calibration in a forward link (central system to subscriber premises), it should be appreciated that reverse link calibration (subscriber premises to central system) and/or pier to pier link calibration (central system to central system or subscriber premises to subscriber premises) calibration may be provided according to the present invention. Accordingly, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or late to be developed that perform substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing correction of signal errors introduced by a network signal path, said method comprising:
    operating a controllable circuit to provide desired operation of said controllable circuit with respect to a signal passed through said controllable circuit, wherein said desired operation of said controllable circuit results in a substantially uniform signal response with respect to said signal passed through said controllable circuit;
    monitoring an attribute of a signal passed through at least a portion of said network signal path; and
    operating said controllable circuit to provide corrective operation of said controllable circuit with respect to said signal passed through said at least a portion of said network signal path responsive to said monitored attribute, wherein said corrective operation of said controllable circuit results in a non-uniform signal response substantially inversely corresponding to a non-uniform signal response of said at least a portion of said network signal path.

2. The method of claim 1, wherein said controllable circuit comprises a tracking filter.

3. The method of claim 1, wherein said substantially uniform signal response and said non-uniform signal response comprise a frequency response.

4. A method for providing correction of signal errors introduced by a network signal path, said method comprising:
    operating a controllable circuit to provide desired operation of said controllable circuit with respect to a signal passed through said controllable circuit, wherein said desired operation of said controllable circuit results in a substantially uniform signal response with respect to said signal passed through said controllable circuit;
    monitoring an attribute of a signal passed through at least a portion of said network signal path;
    operating said controllable circuit to provide corrective operation of said controllable circuit with respect to said signal passed through said at least a portion of said network signal path responsive to said monitored attribute, wherein said corrective operation of said controllable circuit results in a non-uniform signal response substantially inversely corresponding to a non-uniform signal response of said at least a portion of said network signal path; and
    transmitting a calibration signal via said at least a portion of said network signal path, wherein said monitored attribute is an attribute of said calibration signal.

5. The method of claim 4, wherein said desired operation of said controllable circuit is provided using a look up table including information with respect to operation of said controllable circuit, wherein said corrective operation of said controllable circuit is provided using said look up table updated to include information with respect to said at least a portion of said network signal path, and wherein said monitored attribute of said calibration signal is utilized in updating said look up table.

6. The method of claim 4, wherein said calibration signal is one of a plurality of calibration signals transmitted via said at least a portion of said network signal path, and wherein operating said controllable circuit to provide corrective operation is responsive to said monitored attribute of calibration signals of said plurality of calibration signals.

7. The method of claim 6, wherein calibration signals of said plurality of calibration signals are selected to provide a relatively full representation of subscriber signal behavior in said at least a portion of said network signal path.

8. The method of claim 7, wherein said plurality of calibration signals includes substantially equally spaced signals throughout a band of subscriber signals communicated through said at least a portion of said network signal path.

9. The method of claim 4, wherein said calibration signal is transmitted according to a predetermined schedule.

10. A method for providing correction of signal errors introduced by a network signal path, said method comprising:
operating a controllable circuit to provide desired operation of said controllable circuit with respect to a signal passed through said controllable circuit;
monitoring an attribute of a signal passed through at least a portion of said network signal path;
operating said controllable circuit to provide corrective operation of said controllable circuit with respect to said signal passed through said at least a portion of said network signal path responsive to said monitored attribute; and
transmitting a calibration signal via said at least a portion of said network signal path,
wherein said monitored attribute is an attribute of said calibration signal, wherein said calibration signal is transmitted according to a predetermined schedule and wherein said predetermined schedule corresponds to predicted periods of diminished network use.

11. The method of claim 4, further comprising:
transmitting said calibration signal as a function of subscriber use of said network signal path.

12. The method of claim 11, further comprising:
monitoring subscriber use of said network signal path.

13. The method of claim 12, wherein said calibration signal is one of a plurality of calibration signals, wherein said method further comprises:
determining a portion of a network band for which subscriber use is diminished; and
selecting a calibration signal for transmitting corresponding to said portion of said network band for which subscriber use is diminished.

14. The method of claim 12, further comprising:
determining a portion of a network band for which subscriber use has not diminished; and
selecting a calibration signal for transmitting from which corrective information is interpolated corresponding to said portion of said network band for which subscriber use has not diminished.

15. The method of claim 1, wherein a broadband subscriber signal is communicated via said network signal path.

16. The method of claim 15, wherein said broadband subscriber signal comprises a cable television signal.

17. The method of claim 15, wherein said broadband subscriber signal comprises a broadband data signal.

18. A system for providing correction of signal errors associated with transmission of a signal through a signal path, said system comprising:
a tracking filter; and
a controller coupled to said tracking filter, wherein said controller is coupled to a feedback loop to receive information with respect to signals passed by said tracking filter, wherein said controller provides control signals to said tracking filter to correct signal errors introduced by a signal path coupled to said tracking filter responsive to said information received with respect to signals passed by said tracking filter, and wherein said correcting signal errors results in a non-uniform signal response substantially inversely corresponding to a non-uniform signal response of said at least a portion of said signal path.

19. The system of claim 18, wherein said tracking filter comprises at least two adjustable filter circuits to provide controllable selection of low pass cutoff frequencies and high frequency cutoff frequencies.

20. The system of claim 18, wherein said controller is adapted to monitor a calibration signal communicated by said signal path and update a control information database of said controller for use in providing said control signals to correct signal errors.

21. The system of claim 20, wherein said calibration signal comprises a plurality of calibration signals.

22. The system of claim 21 wherein said plurality of calibration signals are selected to provide information throughout a communication signal band.

23. The system of claim 22, wherein said communication signal band is a broadband cable television signal band.

24. The system of claim 22, wherein said controller communicates with a calibration signal source with respect to transmission of said calibration signal.

25. The system of claim 24, wherein said communication provides information with respect to subscriber use of said signal path.

26. The system of claim 24, wherein said communication is utilized to schedule transmission of said calibration signal.

27. The system of claim 24, wherein said communication provides information with respect to said controller correcting signal errors introduced by said signal path.

28. The system of claim 27, wherein said information confirms successful calibration of said tracking filter by said controller.

29. The system of claim 27, wherein said information reports a failure with respect to calibration of said tracking filter by said controller.

30. The system of claim 27, wherein said communication is utilized to predict unacceptable operation of said signal path.

31. The system of claim 27, wherein said communication is utilized to isolate problems with said signal path.

32. A method for providing calibration for signal errors introduced by a network signal path, said method comprising:
providing a controllable circuit responsive to control signals provided to said controllable circuit;
coupling a control circuit to said controllable circuit to thereby provide said control signals;
providing said control circuit with information to provide desired operation of said controllable circuit with respect to a signal passed through said controllable circuit, wherein said desired operation of said controllable circuit results in a substantially uniform signal response with respect to said signal passed through said controllable circuit;
coupling said controllable circuit to at least a portion of said network signal path;
monitoring, by said control circuit, an attribute of a signal passed through said controllable circuit; and
updating, by said control circuit, said information to provide corrective operation of said controllable circuit with respect to a signal passed through said at least a portion of said network signal path, wherein said corrective operation of said controllable circuit results in a non-uniform signal response substantially inversely corresponding to a non-uniform signal response of said at least a portion of said network signal path.

33. The method of claim 32, wherein said controllable circuit comprises a tracking filter.

34. The method of claim 32, wherein said substantially uniform signal response and said non-uniform signal response comprise a frequency response.

35. A method for providing calibration for signal errors introduced by a network signal path, said method comprising:
providing a controllable circuit responsive to control signals provided to said controllable circuit;
coupling a control circuit to said controllable circuit to thereby provide said control signals;
providing said control circuit with information to provide desired operation of said controllable circuit with respect to a signal passed through said controllable circuit, wherein said desired operation of said controllable circuit results in a substantially uniform signal response with respect to said signal passed through said controllable circuit;
coupling said controllable circuit to at least a portion of said network signal path;
monitoring, by said control circuit, an attribute of a signal passed through said controllable circuit;
updating, by said control circuit, said information to provide corrective operation of said controllable circuit with respect to a signal passed through said at least a portion of said network signal path, wherein said corrective operation of said controllable circuit results in a non-uniform signal response substantially inversely corresponding to a non-uniform signal response of said at least a portion of said network signal path; and
transmitting a calibration signal via said at least a portion of said network signal path,
wherein said monitored attribute is an attribute of said calibration signal.

36. The method of claim 35, wherein said desired operation of said controllable circuit is provided using a look up table including information with respect to operation of said controllable circuit, wherein said corrective operation of said controllable circuit is provided using said look up table updated to include information with respect to said at least a portion of said network signal path, and wherein said monitored attribute of said calibration signal is utilized in updating said look up table.

37. The method of claim 35, wherein said calibration signal is one of a plurality of calibration signals transmitted via said at least a portion of said network signal path, and wherein operating said controllable circuit to provide corrective operation is responsive to said monitored attribute of calibration signals of said plurality of calibration signals.

38. The method of claim 37, wherein calibration signals of said plurality of calibration signals are selected to provide a relatively full representation of subscriber signal behavior in said at least a portion of said network signal path.

39. The method of claim 38, wherein said plurality of calibration signals includes substantially equally spaced signals throughout a band of subscriber signals communicated through said at least a portion of said network signal path.

40. The method of claim 35, wherein said calibration signal is transmitted according to a predetermined schedule.

41. The method of claim 35, further comprising:
transmitting said calibration signal as a function of subscriber use of said network signal path.

42. A method for providing calibration for signal errors introduced by a network signal path, said method comprising:
providing a controllable circuit responsive to control signals provided to said controllable circuit;
coupling a control circuit to said controllable circuit to thereby provide said control signals;
providing said control circuit with information to provide desired operation of said controllable circuit with respect to a signal passed through said controllable circuit;
coupling said controllable circuit to at least a portion of said network signal path;
monitoring, by said control circuit, an attribute of a signal passed through said controllable circuit;
updating, by said control circuit, said information to provide corrective operation of said controllable circuit with respect to a signal passed through said at least a portion of said network signal path;
transmitting a calibration signal via said at least a portion of said network signal path,
wherein said monitored attribute is an attribute of said calibration signal;
transmitting said calibration signal as a function of subscriber use of said network signal path;
determining a portion of a network band for which subscriber use is diminished; and
selecting said calibration signal to correspond to said portion of said network band for which subscriber use is diminished.

43. A method for providing calibration for signal errors introduced by a network signal path, said method comprising:
providing a controllable circuit responsive to control signals provided to said controllable circuit;
coupling a control circuit to said controllable circuit to thereby provide said control signals;
providing said control circuit with information to provide desired operation of said controllable circuit with respect to a signal passed through said controllable circuit;
coupling said controllable circuit to at least a portion of said network signal path;
monitoring, by said control circuit, an attribute of a signal passed through said controllable circuit;
updating, by said control circuit, said information to provide corrective operation of said controllable circuit with respect to a signal passed through said at least a portion of said network signal path;
transmitting a calibration signal via said at least a portion of said network signal path, wherein said monitored attribute is an attribute of said calibration signal;
transmitting said calibration signal as a function of subscriber use of said network signal path;
transmitting said calibration signal as a function of subscriber use of said network signal path;
determining a portion of a network band for which subscriber use has not diminished; and
selecting said calibration signal to correspond to said portion of said network band for which subscriber use has not diminished.

44. The method of claim 32, wherein a broadband subscriber signal is communicated via said network signal path.

45. The method of claim 44, wherein said broadband subscriber signal comprises a cable television signal.

46. The method of claim 44, wherein said broadband subscriber signal comprises a broadband data signal.

47. A system for providing calibration for signal errors introduced by a network signal path, said system comprising:
- a controllable circuit providing locally controlled frequency response manipulation with respect to signal received via said network signal path;
- a control circuit coupled to said controllable circuit and operable to control said controllable circuit to provide a desired frequency response using a database of information regarding correcting non-uniform frequency response of said controllable circuit; and
- a feedback circuit coupled to said control circuit operable to provide said control circuit information with respect to frequency response characteristics of at least a portion of said network signal path, wherein said control circuit updates said database to include information regarding correcting non-uniform frequency response of said at least a portion of said network signal path.

48. The system of claim 47, wherein said controllable circuit comprises a tracking filter.

49. The system of claim 48, wherein said desired frequency response of said controllable circuit is a substantially uniform frequency response with respect to operation of said controllable circuit, and wherein said information regarding correcting non-uniform frequency response of said at least a portion of said network signal path is utilized by said controller to control said controllable circuit to have a non-uniform frequency response substantially inversely corresponding to said non-uniform frequency response of said at least a portion of said network signal path.

50. The system of claim 48, wherein said controllable circuit is coupled to a single conversion tuner, and wherein said controllable circuit is tuned by said control circuit to allow only a few channels to pass into the single conversion tuner.

51. The system of claim 47, wherein said feedback circuit provides said control circuit information with respect to a calibration signal received via said at least a portion of said network signal path.

52. The system of claim 51, wherein said control circuit updates said database as a function of comparison of said information with respect to said calibration signal to predetermined information with respect to receiving said calibration signal.

53. The system of claim 51, wherein said control circuit updates said database as a function of comparison of said information with respect to said calibration signal to other information monitored by said control circuit.

54. The system of claim 47, wherein said control circuit includes a calibration feedback interface coupled to a centralized system and providing information with respect to said updating said database.

55. The system of claim 54, wherein said centralized system comprises a cable plant.

56. The system of claim 54, wherein said centralized system comprises a network operations center.

57. The system of claim 47, wherein said signal received via said network signal path comprises a broadband signal.

58. The system of claim 57, wherein said broadband signal comprises a cable television signal.

59. The system of claim 57, wherein said broadband signal comprises a broadband data signal.

* * * * *